United States Patent
Okada

(10) Patent No.: US 9,866,272 B2
(45) Date of Patent: Jan. 9, 2018

(54) COMMUNICATION SYSTEM COMPRISING A CONNECTOR HAVING FIRST AND SECOND WAVEGUIDES DISPOSED IN PROXIMITY TO EACH OTHER FOR COUPLING MILLIMETER-WAVE DATA SIGNALS

(71) Applicant: Sony Semiconductor Solutions Corporation, Kanagawa (JP)

(72) Inventor: Yasuhiro Okada, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/633,397

(22) Filed: Feb. 27, 2015

(65) Prior Publication Data

US 2015/0270595 A1    Sep. 24, 2015

(30) Foreign Application Priority Data

Mar. 18, 2014    (JP) .................. 2014-054564

(51) Int. Cl.
| | |
|---|---|
| H04B 3/52 | (2006.01) |
| H04B 1/40 | (2015.01) |
| H04B 5/00 | (2006.01) |
| H01P 1/04 | (2006.01) |
| H01P 5/02 | (2006.01) |
| H01P 1/08 | (2006.01) |

(52) U.S. Cl.
CPC ............. *H04B 3/52* (2013.01); *H01P 1/042* (2013.01); *H01P 5/024* (2013.01); *H04B 1/40* (2013.01); *H04B 5/0031* (2013.01); *H01P 1/08* (2013.01)

(58) Field of Classification Search
CPC .. H01P 1/042; H01P 1/08; H01P 5/024; H04B 3/52; H04B 5/0018; H04B 5/0031
USPC ........................................ 333/254, 252, 24 R
See application file for complete search history.

(56) References Cited

U.S. PATENT DOCUMENTS

| | | | | |
|---|---|---|---|---|
| 2,476,621 A | * | 7/1949 | Okress | H01P 1/042 285/148.22 |
| 2,927,288 A | * | 3/1960 | Ray | H01P 1/08 174/22 R |
| 2,930,008 A | * | 3/1960 | Walsh | H01P 1/08 333/252 |

(Continued)

FOREIGN PATENT DOCUMENTS

| | | |
|---|---|---|
| JP | H09-191201 A | 7/1997 |
| JP | H09-275301 A | 10/1997 |

(Continued)

OTHER PUBLICATIONS

Japanese Office Action dated Feb. 14, 2017 for corresponding Japanese Application No. 2014-054564.

*Primary Examiner* — Benny Lee
(74) *Attorney, Agent, or Firm* — Michael Best & Friedrich LLP

(57) ABSTRACT

Provided is a connector system including a first waveguide having a first opening terminal and a second waveguide having a second opening terminal. The first and second waveguides transmit a high-frequency signal when the first opening terminal is in contact with or in the vicinity of the second opening terminal. A dielectric plate is provided on an opening terminal surface of at least one of the first and second opening terminals.

22 Claims, 10 Drawing Sheets

(56) References Cited

U.S. PATENT DOCUMENTS

| | | | |
|---|---|---|---|
| 3,594,667 A * | 7/1971 | Mann | H01P 1/08 333/251 |
| 3,860,891 A | 1/1975 | Hiramatsu | |
| 4,302,064 A * | 11/1981 | Spinner | H01P 1/042 174/21 C |
| 4,511,868 A * | 4/1985 | Munson et al. | H01P 1/067 333/21 A |
| 5,136,272 A * | 8/1992 | Kormann et al. | H01P 1/08 156/108 |
| 5,977,841 A * | 11/1999 | Lee et al. | H01P 1/045 333/24 C |
| 2005/0219015 A1 * | 10/2005 | Mitrovic | H01P 1/08 333/252 |

FOREIGN PATENT DOCUMENTS

| | | |
|---|---|---|
| JP | 2006-065700 | 3/2006 |
| JP | 2009-171488 A | 7/2009 |
| JP | 2010-278752 A | 12/2010 |

* cited by examiner

COMMUNICATION SYSTEM COMPRISING A CONNECTOR HAVING FIRST AND SECOND WAVEGUIDES DISPOSED IN PROXIMITY TO EACH OTHER FOR COUPLING MILLIMETER-WAVE DATA SIGNALS

CROSS REFERENCE TO RELATED APPLICATIONS

This application claims the benefit of Japanese Priority Patent Application JP 2014-054564 filed Mar. 18, 2014, the entire contents of which are incorporated herein by reference.

BACKGROUND

The present disclosure relates to a connector system, a communication device, and a communication system.

There is known such a following communication system. One communication device communicates with the other communication device when one chassis (device body) is in contact with or in the vicinity of the other chassis (device body). As an example of this kind of communication system, there is known a communication system including two communication devices, i.e., a mobile terminal device and a wireless communication device called a cradle (for example, see Japanese Patent Application Laid-open No. 2006-65700).

SUMMARY OF THE INVENTION

In this communication system, one communication device communicates with the other communication device when one chassis (device body) is in contact with or in the vicinity of the other chassis (device body). From viewpoints of transmission characteristics, interference to other devices, and the like, it is important for such a communication system not to leak radio waves externally, i.e., outside of the chassis. However, the conventional communication system employs wireless communication using slot antennas. Because of this, radio waves easily leak outside of the chassis. As a result, transmission characteristics may be degraded. This point (problem) is apparent from the fact that a radio wave absorber is arranged around a chassis to thereby prevent a radio wave from being leaked in Example 3 of Japanese Patent Application Laid-open No. 2006-65700.

It is desirable to provide a connector device, a communication device, and a communication system capable of suppressing degradation of transmission characteristics resulting from an external leakage of radio waves from a chassis when two communication devices communicate with each other when one chassis is in contact with or in the vicinity of the other chassis.

According to an embodiment of the present disclosure, there is provided a connector system, comprising: a first waveguide having a first opening terminal and a second waveguide having a second opening terminal, the first and second waveguides being configured to transmit a high-frequency signal when the first opening terminal is in contact with or in the vicinity of the second opening terminal; and a dielectric plate provided on an opening terminal surface of at least one of the first and second opening terminals.

According to another embodiment of the present disclosure, there is provided a communication device, comprising: a connector system including a waveguide, and a dielectric plate provided on an opening terminal surface of the waveguide, wherein the communication device is configured to transmit a high-frequency signal when the opening terminal of the waveguide is in contact with or in the vicinity of another opening terminal of a waveguide of another communication device including another waveguide.

According to yet another embodiment of the present disclosure, there is provided a communication system comprising: a first communication device including a first waveguide and a second communication device including a second waveguide, the first and second waveguides respectively being configured to transmit a high-frequency signal, the first and second communication devices respectively being configured to communicate with each other when the first waveguide is in contact with or in the vicinity of the second waveguide; a connector system configured to connect the first and second waveguides when a first opening terminal of the first waveguide is in contact with or in the vicinity of a second opening terminal of the second waveguide, wherein the connector system includes a dielectric plate provided on an opening terminal surface of at least one of the first and second waveguides.

Here, one communication device is "in the vicinity of" the other communication device such that the transmission range of a millimeter-waveband signal is controlled. Typically, when one communication device is "in the vicinity of" the other communication device, the distance therebetween is smaller than the distance between communication devices used for broadcasting or general wireless communication. More specifically, here, when one communication device is "in the vicinity of" the other communication device, the distance (space) therebetween is equal to or less than 10 [cm], preferably equal to or less than 1 [cm].

The connector system, the communication device, or the communication system having the above-mentioned structure establishes communication when the opening terminal of one waveguide is in contact with or in the vicinity of the opening terminal of the other waveguide. Because of this, the connector system, the communication device, or the communication system is capable of suppressing more radio waves leaking externally than wireless communication using slot antennas. Moreover, the dielectric plate is provided on at least one of the opening terminal surfaces of the waveguides of the two communication devices. As a result, metal is not exposed on the contact surface.

According to the present disclosure, it is possible to suppress more radio waves leaking externally than wireless communication using slot antennas. As a result, it is possible to suppress degradation of transmission characteristics resulting from leakage of radio waves.

Note that effects are not necessarily limited to the above-mentioned effects. Any effect described in this specification may be obtained. Moreover, the effects described in this specification are only examples. Effects are not limited to the effects described in this specification. Moreover, additional effects may be obtained.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Figure 1:
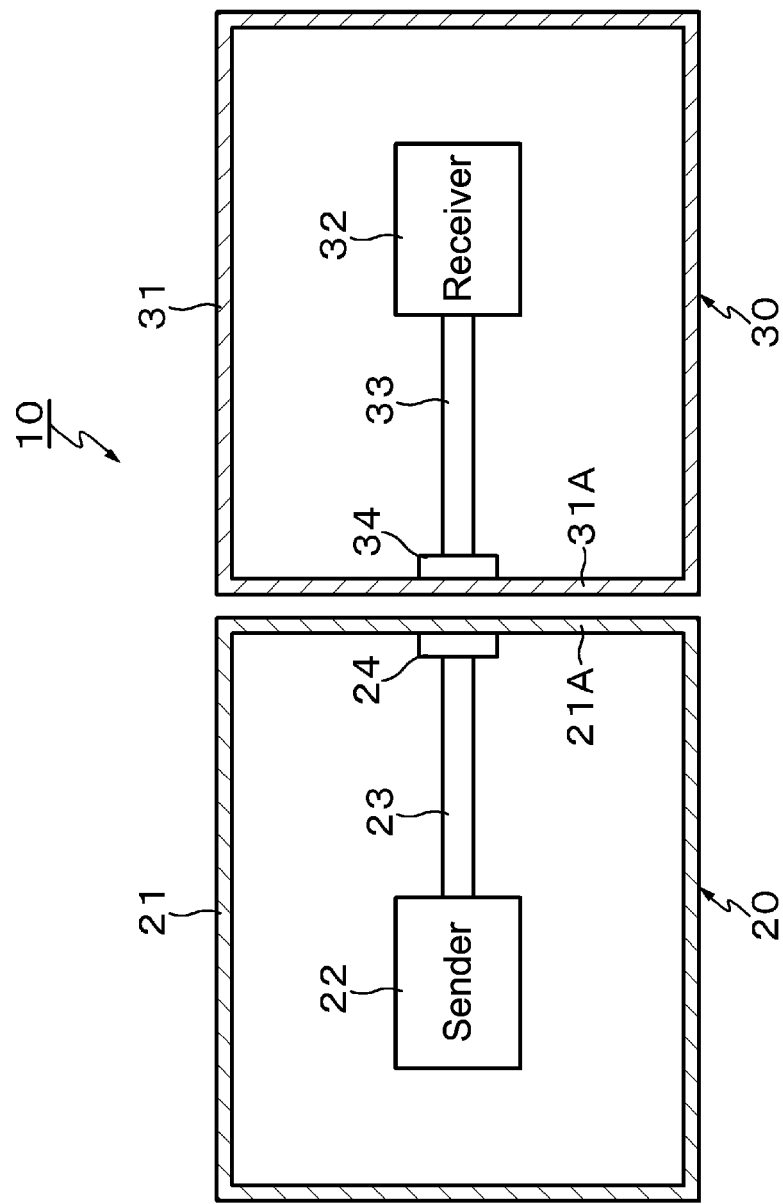
FIG. 1 is a plan view partially including a sectional view showing an example of the structure of the communication system according to an embodiment of the present disclosure.

Hereinafter, an embodiment of the present disclosure will be described with reference to the drawings. The technology of the present disclosure is not limited to the embodiment. In the embodiment, various numerical values and the like are merely examples. In the following description, the same elements or elements having the same functions are denoted by the same reference symbols. Repetition in a description will be avoided. Note that description will be made in the following order.

1. Connector device, communication device, and communication system of the present disclosure;
2. Communication system of an embodiment of the present disclosure;
3. Modification examples of the embodiment; and
4. Specific examples of the communication system of the embodiment.

<Connector Device, Communication Device, and Communication System of the Present Disclosure, and Description of the Outline>

According to a connector device and a communication system of the present disclosure, two communication devices (two waveguides) communicate with each other by using signals. Examples of the signals include high-frequency signals such as electromagnetic waves, specifically, microwaves, millimeter waves, terahertz waves, and the like. The communication system using such high-frequency signals is preferably used for transmission of signals between various apparatuses such as electronic apparatuses, information processing apparatuses, and semiconductor apparatuses, transmission of signals between circuit boards mounted on one apparatus (device), and the like.

A connector device, a communication device, or a communication system preferably including the above-mentioned structure preferably uses high-frequency signals (for example, millimeter-waveband signals) as signals used for communication between two communication devices. The millimeter-waveband signals are radio waves whose frequency is 30 [GHz] to 300 [GHz] (wavelength is 1 [mm] to 10 [mm]). If millimeter-waveband signals are transmitted for communication, high-speed signal transmission of Gbps order (for example, 5 [Gbps] or more) is realized. Examples of signals, which require high-speed signal transmission of Gbps order, include data signals such as cinema images and computer images, for example. Moreover, millimeter-waveband signal transmission has high interference immunity, and does not interfere with other electric wiring of cable connection between apparatuses, which are advantageous.

The connector device, the communication device, and the communication system including the above-mentioned preferable structure may include a dielectric protrusion provided on a plane, on which the opening terminal surface of the waveguide is in contact with the dielectric plate, at the center position of the opening terminal surface. Moreover, the dielectric plate and the dielectric protrusion may be provided at least on a sender-side waveguide. Moreover, at least the sender-side waveguide may include a choke structure around the opening terminal. The depth of a groove of the choke structure may be ¼ of the high-frequency wavelength transmitted by the two waveguides.

Moreover, in the connector device, the communication device, and the communication system including the above-mentioned preferably structure, the dielectric protrusion may be a 3D structure, the 3D structure being one of a rectangular parallelepiped and a column. Moreover, the height of the dielectric protrusion from a plane, on which the opening terminal surface of the waveguide is in contact with the dielectric plate, may be ½ of the high-frequency wavelength transmitted by the two waveguides. Moreover, if the 3D structure is a rectangular parallelepiped, the length of each side of the dielectric protrusion may be ½ of the high-frequency wavelength, and if the 3D structure is a column, the diameter of the dielectric protrusion may be ½ of the high-frequency wavelength.

In the connector device, the communication device, and the communication system including the above-mentioned preferably structure and mode, the dielectric plate may be part of a chassis, the waveguide being housed within the chassis. Moreover, the dielectric protrusion may be integrally formed with the dielectric plate, the waveguide being housed within the chassis.

In the connector device, the communication device, and the communication system including the above-mentioned preferably structure and mode, the cross-sectional shape of each of the two waveguides may be a rectangle. Preferably, the ratio of the long side and the short side of the cross-sectional surface of each of the two waveguides may be 2:1. Alternatively, the cross-sectional shape of at least one of the two waveguides may be one of a square and a circle. Moreover, if the cross-sectional shape of at least one of the two waveguides is a square, at least one of the two waveguides may be capable of performing bidirectional communication using a horizontally-polarized wave and a vertically-polarized wave, and if the cross-sectional shape of at least one of the two waveguides is a circle, at least one of the two waveguides may be capable of performing bidirectional communication using a right-handed circularly polarized wave and a left-handed circularly polarized wave.

Moreover, in the connector device, the communication device, and the communication system including the above-mentioned preferably structure and mode, at least one of the two waveguides may include a pair of structures, each of the pair of structures including a waveguide path, the dielectric plate, and the dielectric protrusion, at least one of the two waveguides being configured to perform bidirectional communication. In this case, preferably, the pair of structures may be integrally formed, each of the pair of structures including a waveguide path, the dielectric plate, and the dielectric protrusion.

<Communication System of Embodiment of Present Disclosure>

FIG. 1 is a plan view partially including a sectional view showing an example of the structure of the communication system according to an embodiment of the present disclosure. The communication system 10 of this embodiment has the following structure. One communication device (specifically, first communication device 20) communicates with the other communication device (specifically, second communication device 30) via transmission paths of a plurality of systems, where one chassis (device body) is in contact with or in the vicinity of the other chassis (device body).

A sender 22 and a waveguide 23 are housed within a chassis 21 of the first communication device 20. Similarly, a receiver 32 and a waveguide 33 are housed within a chassis 31 of the second communication device 30. Each of the chassis 21 of the first communication device 20 and the chassis 31 of the second communication device 30 is, for example, a rectangular parallelepiped. Each of the chassis 21 of the first communication device 20 and the chassis 31 of the second communication device 30 is made of a dielectric resin whose permittivity is about 3 and thickness is about 0.2 [mm], for example. In other words, each of the chassis 21 of the first communication device 20 and the chassis 31 of the second communication device 30 is a chassis made of a resin.

The communication system 10 includes the first communication device 20 and the second communication device 30. When a surface of the chassis 21 is preferably in contact with or in the vicinity of a surface of the chassis 31, the first communication device 20 communicates with the second communication device 30 by using a high-frequency signal, for example, a millimeter-waveband signal. Here, if a high-frequency signal is a millimeter-waveband signal, the first communication device 20 is "in the vicinity of" the second communication device 30 such that the transmission range of a millimeter-waveband signal is controlled. Typically, when the first communication device 20 is "in the vicinity of" the second communication device 30, the distance therebetween is smaller than the distance between communication devices used for broadcasting or general wireless communication. More specifically, when the first communication device 20 is "in the vicinity of" the second communication device 30, the distance (space) therebetween is equal to or less than 10 [cm], preferably equal to or less than 1 [cm].

In the first communication device 20, the waveguide 23 is provided between the output terminal of the sender 22 and the inner surface of the resin plate (resin sheet) 21A at the second communication device 30 side. The waveguide 23 functions as a transmission path for transmitting a millimeter-waveband signal sent from the sender 22. Similarly, in the second communication device 30, the waveguide 33 is provided between the input terminal of the receiver 32 and the inner surface of the resin plate (resin sheet) 31A at the first communication device 20 side. The waveguide 33 functions as a transmission path for transmitting a millimeter-waveband signal to be received. The opening terminal of the waveguide 23 of the first communication device 20 is in the vicinity of or in contact with the opening terminal of the waveguide 33 of the second communication device 30 with the resin plate 21A and the resin plate 31A interposed therebetween. If the surface of the chassis 21 is in the vicinity of the surface of the chassis 31, airspace is interposed between the resin plate 21A and the resin plate 31A.

Examples of the waveguide include a hollow waveguide and a dielectric waveguide. Each of a hollow waveguide and a dielectric waveguide may be used as each of the waveguide 23 of the first communication device 20 and the waveguide 33 of the second communication device 30. Here, a hollow waveguide, specifically, a rectangular waveguide is used. The cross-sectional shape of a rectangular waveguide is a rectangle. Preferably, the ratio of the long side and the short side of the cross-sectional surface of a rectangular waveguide is 2:1. The 2:1 rectangular waveguide is capable of preventing a high-order mode from occurring and transmitting a signal efficiently, which are effective. Note that the cross-sectional shape of each of the waveguides 23 and 33 may not be a rectangle but a square or a circle, for example.

The waveguide 23 has a choke structure 24 around the opening terminal. The waveguide 33 has a choke structure 34 around the opening terminal. Since the waveguide 23 has the choke structure 24, the choke structure 24 is capable of suppressing radio waves leaking externally from the waveguide 23. Since the waveguide 33 has the choke structure 34, the choke structure 34 is capable of suppressing radio waves leaking externally from the waveguide 33. The structure of the choke structure 24 and the structure of the choke structure 34 will be described later specifically.

The sender 22 converts a signal to be transmitted into a millimeter-waveband signal, and outputs the millimeter-waveband signal to the waveguide 23. The receiver 32 receives the millimeter-waveband signal transmitted through the waveguide 33, and returns (reconstructs) the millimeter-waveband signal to an original signal before being transmitted. Hereinafter the structure of the sender 22 and the structure of the receiver 32 will be described specifically.

Figure 2A:
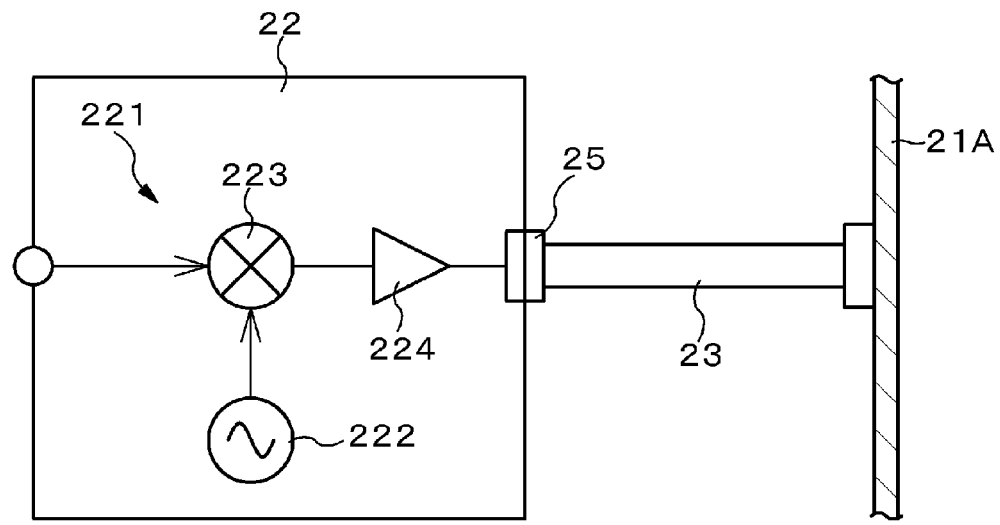
FIG. 2A is a block diagram showing an example of a specific structure of the sender.
Figure 2B:
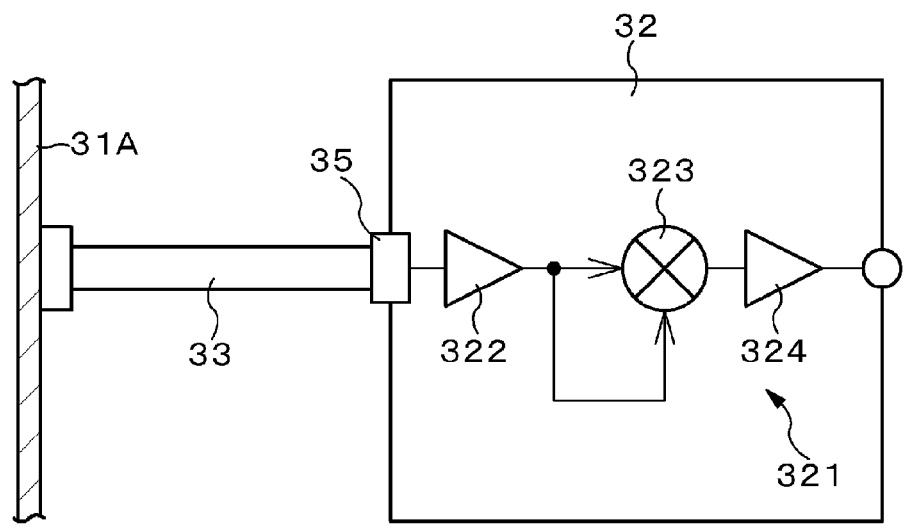
FIG. 2B is a block diagram showing an example of the specific structure of a receiver.

FIG. 2A shows an example of the specific structure of the sender 22. FIG. 2B shows an example of the specific structure of the receiver 32.

As shown in FIG. 2A, the sender 22 includes a signal generator 221. The signal generator 221 processes a signal to be transmitted, and generates a millimeter-waveband signal, for example. The signal generator 221 functions as a signal converter configured to convert a signal to be transmitted into a millimeter-waveband signal. For example, the signal generator 221 includes an ASK (Amplitude Shift Keying) modulation circuit. Specifically, in the signal generator 221, the multiplier 223 is configured to multiply a millimeter-waveband signal from the oscillator 222 by a signal to be transmitted to thereby generate a millimeter-waveband ASK-modulated wave. In the signal generator 221, the buffer 224 is configured to store the generated millimeter-waveband ASK-modulated wave. The signal generator 221 is configured to output the buffered millimeter-waveband ASK-modulated wave.

The connector device 25 is provided between the sender 22 and the waveguide 23. The connector device 25 couples the sender 22 and the waveguide 23 by for example capacitive coupling, electromagnetic induction coupling, electromagnetic-field coupling, resonator coupling, or the like. The waveguide 23 is provided between the connector device 25 and the resin plate 21A. The opening terminal surface of the waveguide 23 is in contact with the inner surface of the resin plate 21A, i.e., a wall of the chassis 21 at the second communication device 30 side.

As shown in FIG. 2B, the receiver 32 includes a signal reconstructor 321. The signal reconstructor 321 processes a millimeter-waveband signal given through the waveguide 33, and reconstructs an original signal before being output, for example. The signal reconstructor 321 functions as a signal converter configured to convert a received millimeter-waveband signal into an original signal before being output. For example, the signal reconstructor 321 includes a square-law detector circuit. Specifically, in the signal reconstructor 321, the multiplier 323 is configured to obtain the square of a millimeter-waveband signal (ASK-modulated wave) given via the buffer 322 to thereby convert the millimeter-waveband signal (ASK-modulated wave) into an original signal before being output. In the signal reconstructor 321, the buffer 324 is configured to store the generated original signal. The signal reconstructor 321 is configured to output the buffered original signal.

The connector device 35 is provided between the waveguide 33 and the receiver 32. The connector device 35 couples the waveguide 33 and the receiver 32 by for example capacitive coupling, electromagnetic induction coupling, electromagnetic-field coupling, resonator coupling, or the like. The waveguide 33 is provided between the resin plate 31A and the connector device 35. The opening terminal surface of the waveguide 33 is in contact with the inner surface of the resin plate 31A, i.e., a wall of the chassis 31 at the first communication device 20 side.

As described above with respect to FIG. 1, in the communication system 10 of this embodiment, the first communication device 20 communicates with the second communication device 30 by using a millimeter-waveband signal when a surface of the chassis 21 is in contact with or in the vicinity of a surface of the chassis 31 (the chassis 21 is in contact with or in the vicinity of the chassis 31). In the communication system 10, the resin plate 21A (specifically, dielectric plate) is provided on the opening terminal surface of the waveguide 23. The resin plate 21A is part of the chassis 21. In the communication system 10, the resin plate 31A (specifically, dielectric plate) is provided on the opening terminal surface of the waveguide 33. The resin plate 31A is part of the chassis 31. Moreover, the opening terminal of the waveguide 23 and the resin plate 21A function as the first communication device 20. The opening terminal of the waveguide 33 and the resin plate 31A function as the second communication device 30. More specifically, the opening terminal of the waveguide 23, the resin plate 21A, the opening terminal of the waveguide 33, and the resin plate 31A function as a connector device (i.e., connector device of the present disclosure) configured to couple the waveguide 23 and the waveguide 33 via the dielectric plates when the opening terminal is in contact with or in the vicinity of the other opening terminal.

According to this embodiment, the communication system 10 including the connector device having the above-mentioned structure establishes communication when the opening terminal of the waveguide 23 is in contact with or in the vicinity of the opening terminal of the waveguide 33. Because of this, the communication system 10 is capable of transmitting a signal having a wider bandwidth than that of a signal transmitted via wireless communication using slot antennas. In addition, the communication system 10 is capable of suppressing radio waves leaking externally from the waveguides 23 and 33. Specifically, the waveguide 23 has the choke structure 24 around the opening terminal, and the waveguide 33 has the choke structure 34 around the opening terminal. Because of this, the choke structures 24 and 34 are capable of suppressing radio waves leaking externally from the waveguides 23 and 33 more positively.

As a result, the communication system 10 is capable of suppressing degradation of transmission characteristics between the waveguide 23 and the waveguide 33 resulting from leakage of radio waves.

Note that the communication mode employs so-called millimeter-wave communication, i.e., communication using a millimeter-waveband signal as a high-frequency signal. As a result, the following advantages are obtained.

a) The millimeter-wave communication uses a wider communication band. Because of this, it is easy to obtain a higher data rate.

b) A frequency used for transmission is removed from a frequency used for another baseband signal processing. As a result, interference to the frequency of a millimeter wave from the frequency of a baseband signal may not occur.

c) Because the wavelength of a millimeter waveband is small, a coupling structure and a waveguide structure, each of which depends on a wavelength, can be small. In addition, distance attenuation is large and diffraction is small. As a result, it is easy to perform electromagnetic shielding.

d) In general wireless communication, stability of a carrier wave is strictly regulated in order to prevent interference and the like. To realize such a carrier wave having a high stability, outer frequency reference components having a high stability, a multiplier circuit, a PLL (phase locked loop) circuit, and the like are used. As a result, the size of the circuit increases. To the contrary, according to the millimeter-wave communication, a millimeter wave does not externally leak easily, and a carrier wave low in stability is used for transmission. As a result, increase of the size of the circuit is limited.

Specifically, in the millimeter-wave communication, the transmission path of the first communication device 20 has a waveguide structure using the waveguide 23. The transmission path of the second communication device 30 has a waveguide structure using the waveguide 33. In the communication system, the first communication device 20 communicates with the second communication device 30 when the first communication device 20 is in contact with or in the vicinity of the second communication device 30. As a result, input of unnecessary signals from outside the communication system is suppressed. As a result, it is not necessary to provide a complex circuit such as an arithmetic circuit configured to remove the signal.

Meanwhile, another connector device couples the waveguide 23 and the waveguide 33 via a dielectric plate when the opening terminal of the waveguide 23 is in contact with or in the vicinity of the opening terminal of the waveguide 33. In such a connector device, the dielectric plate may reflect radio waves, and transmission characteristics between the waveguide 23 and the waveguide 33 may be degraded. To the contrary, according to the communication system 10 of this embodiment, a dielectric protrusion is provided on a plane, on which the opening terminal surface of the waveguide 23 is in contact with the dielectric plate, at the center position of the opening terminal surface. A dielectric protrusion further is provided on a second plane, on which the opening terminal surface of the waveguide 33 is in contact with the dielectric plate, at the center of the opening terminal.

Figure 3A:
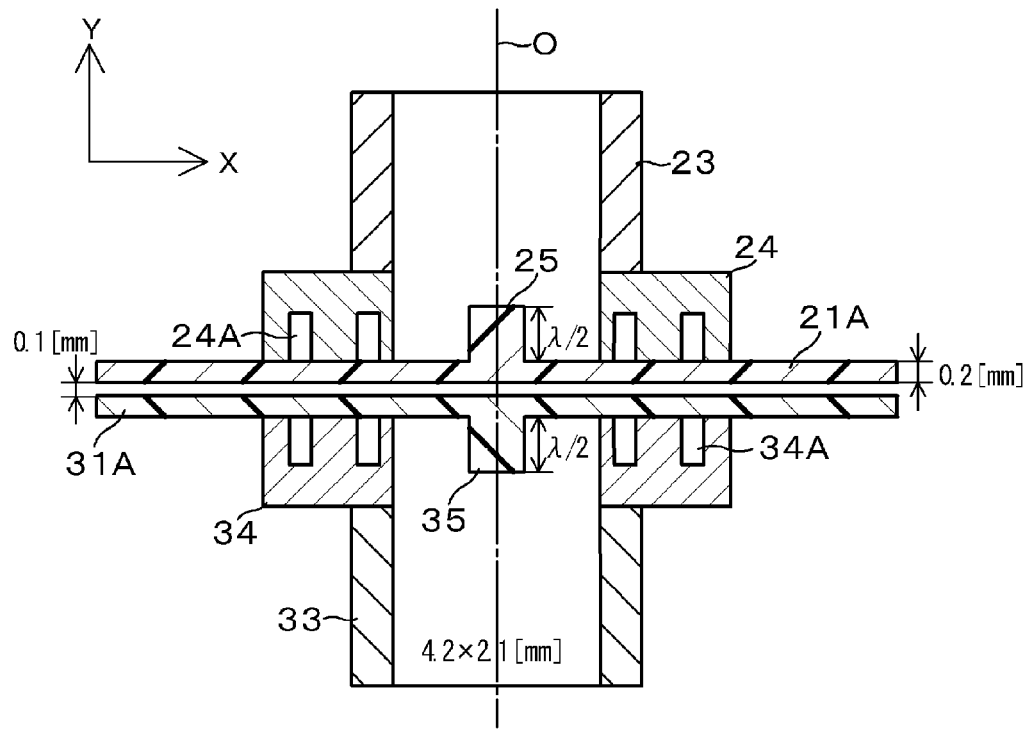
FIG. 3A is a cross-sectional view showing an example of the structure of a connector device of the present disclosure.

More specifically, as shown in FIG. 3A, the communication system 10 of FIG. 1 of this embodiment includes dielectric protrusions 25 and 35. The dielectric protrusion 25 is provided on the inner surface of the resin plate 21A at the center of the opening terminal surface of the waveguide 23. The dielectric protrusion 35 is provided on the inner surface of the resin plate 31A at the center of the opening terminal surface of the waveguide 33. Here, "the center of the opening terminal surface" means the center of the opening terminal surface not only exactly but also substantially. Design variations or manufacturing variations are allowable.

Preferably, from a viewpoint of reducing the number of steps of a manufacturing process, the dielectric protrusions 25 and 35, i.e., the protrusions 25 and 35 made of dielectric materials, are formed integrally with the dielectric plates (the resin plates 21A and 31A), more specifically, the chassis 21 and 31 of FIG. 1 are similarly made of dielectric materials.

FIG. 3A is a cross-sectional view showing an example of the structure of the connector device of the present disclosure. The connector device of the present disclosure couples the waveguide 23 and the waveguide 33 via the dielectric plates (i.e., the resin plates 21A and 31A) when the opening terminal of the waveguide 23 is in contact with or in the vicinity of the opening terminal of the waveguide 33. Here, as an example, a 2:1 rectangular waveguide (hollow waveguide) is used as each of the waveguides 23 and 33. The length of the long side of the cross-sectional surface of the 2:1 rectangular waveguide (hollow waveguide) is 4.2 [mm], and the length of the short side thereof is 2.1 [mm]. Further, in the example shown in FIG. 3A, the thickness of each of the resin plates 21A and 31A is 0.2 [mm]. Airspace is provided between the resin plates 21A and 31A, and the thickness of the airspace is about 0.1 [mm].

As shown in FIG. 3A, the choke structure 24 is integrally provided around the opening terminal of the waveguide 23. The choke structure 34 is integrally provided around the opening terminal of the waveguide 33. The choke structure 24 includes grooves 24A circularly (in this example, rectangular-circularly) formed around the central axis O of the waveguide 23. The choke structure 34 includes grooves 34A circularly (in this example, rectangular-circularly) formed around the central axis O of the waveguide 33. The depth of the grooves 24A of the choke structure 24 is ¼ of the wavelength $\lambda$ ($\lambda/4$) of a high-frequency wave (in this example, millimeter wave) transmitted through the waveguide 23. The depth of the grooves 34A of the choke structure 34 is ¼ of the wavelength $\lambda$ ($\lambda/\lambda$) of a high-frequency wave (in this example, millimeter wave) transmitted through the waveguide 33. Preferably, the grooves 24A have a pitch that is $A/\lambda$. Preferably, the grooves 34A have a pitch that is $A/\lambda$. Here, "$A/\lambda$" means not only exactly but also substantially $A/\lambda$. Design variations or manufacturing variations are allowable.

If the depth of the grooves 24A is $A/\lambda$, under a static state, the phase of the incident wave entering the choke structure 24 is reversed, whereby a reflected wave is generated in the grooves 24A. If the depth of the grooves 34A is $A/\lambda$, under a static state, the phase of the incident wave entering the choke structure 34 is reversed, whereby a reflected wave is generated in the grooves 34A. As a result, the reflected wave generated in the grooves 24A offsets the incident wave, and the reflected wave generated in the grooves 34A offsets the incident wave. As a result, the incident wave does not travel externally from the choke structure 24, and the incident wave does not travel externally from the choke structure 34. As a result, the connector device is capable of suppressing the external leakage of radio waves. Note that the connector device couples the waveguide 23 and the waveguide 33 via the resin plates 21A and 31A when the opening terminal of the waveguide 23 is in contact with or in the vicinity of the opening terminal of the waveguide 33.

Here, in this example, the choke structure 24 has the two grooves 24A, and the choke structure 34 has the two grooves 34A. Alternatively, each choke structure may have one groove, or three or more grooves. Note that the larger the number of the grooves 24A and 34A, the more the external leakage of radio waves is suppressed.

Figure 3B:
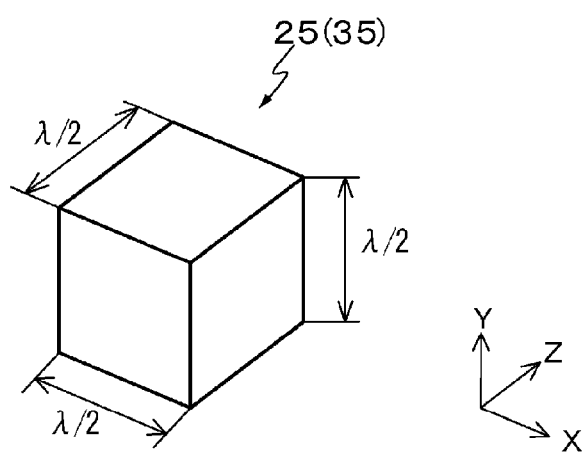
FIG. 3B is a perspective view showing an example of the shape of the dielectric protrusion of the connector device of the present disclosure.

FIG. 3B shows an example of the shape of the dielectric protrusion 25 or 35 of the connector device of the present disclosure having the above-mentioned structure. The dielectric protrusion 25 (35) has a 3D (three-dimensional) structure. For example, as shown in FIG. 3B, the dielectric protrusion 25 (35) is a rectangular parallelepiped. The height of the rectangular-parallelepiped dielectric protrusion 25 (35) in the Y direction is $A/\lambda$. The height (Y direction) is from a plane on which the opening terminal surface of the waveguide 23 (33) is in contact with the resin plate 21A (31A). Specifically, the height (Y direction) is from the inner surface of the resin plate 21A. In this example, the dielectric protrusion 25 is a cubic protrusion. The length of each side (X direction and Z direction) thereof is $A/\lambda$. Here, "$A/\lambda$" means not only exactly but also substantially $A/\lambda$. Design variations or manufacturing variations are allowable.

Note that the dielectric protrusion 25 (35) is not limited to a rectangular parallelepiped including a cube. Alternatively, the dielectric protrusion 25 (35) may be another 3D structure, for example, a column as long as the height of the dielectric protrusion 25 (35) from the inner surface of the resin plate 21A is $A/\lambda$. Moreover, if a 3D structure is a column, the diameter may be the same as the height, i.e., $A/\lambda$. As a result, functions and effects similar to those of the dielectric protrusion 25 (35), which is a rectangular parallelepiped (cube) $A/\lambda$ on a side, are obtained.

As described above, according to this embodiment, the connector device is configured to couple the waveguide 23 and the waveguide 33 via the resin plates 21A and 31A when the opening terminal of the waveguide 23 is in contact with or in the vicinity of the opening terminal of the waveguide 33. As a result, the connector device is capable of suppressing more external leakage of radio waves than wireless communication using slot antennas. As a result, the connector device is capable of suppressing more degradation of transmission characteristics resulting from leakage of radio waves than wireless communication using slot antennas. Note that, in some connector devices, metal materials contact with each other. Such a connector device has problems of a poor electrical contact resulting from a deteriorated connector device, contact wear and decrease of connection reliability resulting from attaching or removing, and difficulty of waterproofing. To the contrary, according to the connector device of this embodiment, metal is not exposed on a contact surface. As a result, connection reliability is increased and the connector device is waterproofed easily, which are advantageous.

Further, according to the connector device of this embodiment, the dielectric protrusion 25 is provided on the inner surface of the resin plate 21A, and the dielectric protrusion 35 is provided on the inner surface of the resin plate 31A. As a result, the following functions and effects are obtained. The height of the dielectric protrusion 25 from the inner surface of the resin plate 21A is A/λ, and the height of the dielectric protrusion 35 from the inner surface of the resin plate 31A is A/λ. As a result, a A/λ resonator is formed. The A/λ resonator transmits only a radio wave having a band which resonates with a radio wave propagating through the waveguides 23 and 33. As a result, when the waveguides 23 and 33 transmit a millimeter-waveband signal, it is possible to suppress reflection of radio waves at a contact surface of the opening terminal surface of the waveguide 23 and the resin plate 21A and a contact surface of the opening terminal surface of the waveguide 33 and the resin plate 31A. As a result, the connector device is capable of suppressing degradation of transmission characteristics between the first communication device 20 and the second communication device 30. More specifically, the connector device is capable of suppressing degradation of transmission characteristics between the waveguide 23 and the waveguide 33 resulting from reflection of radio waves.

Figure 4A:
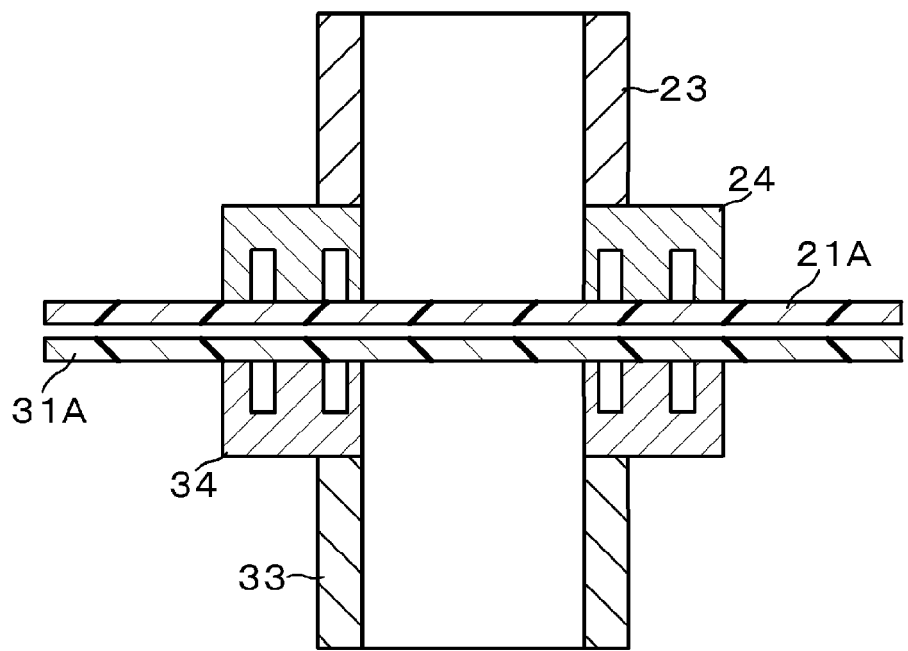
FIG. 4A is a cross-sectional view showing a cross-sectional structure of a connector device including no dielectric protrusions.
Figure 4B:
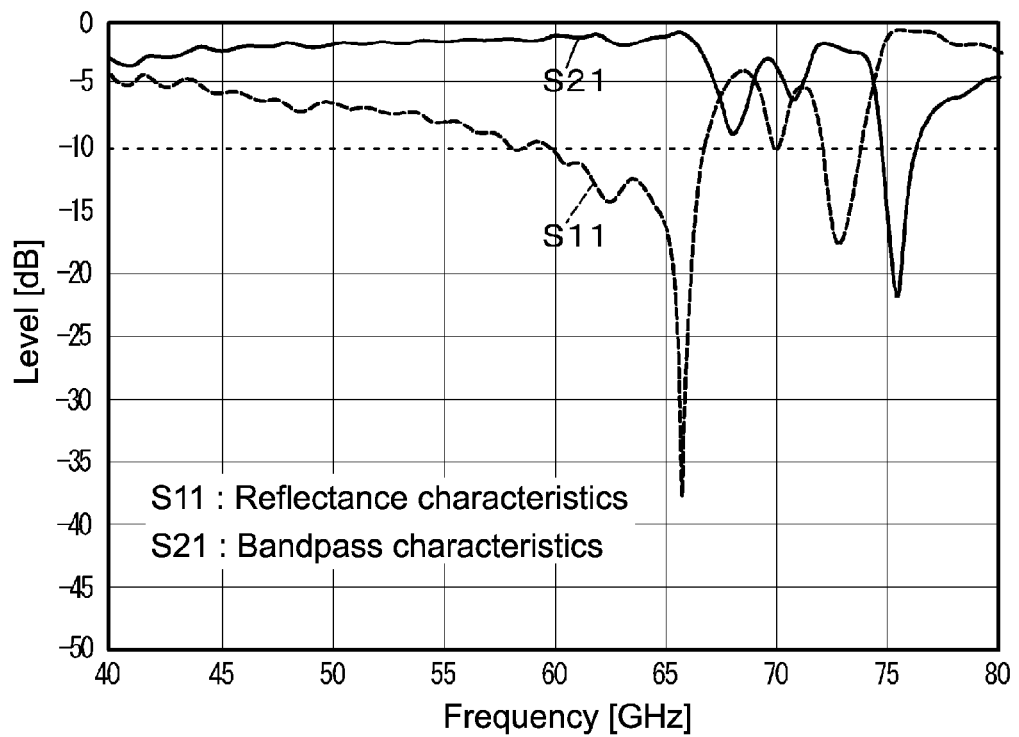
FIG. 4B is a diagram showing transmission characteristics of the connector device including no dielectric protrusions.
Figure 5A:
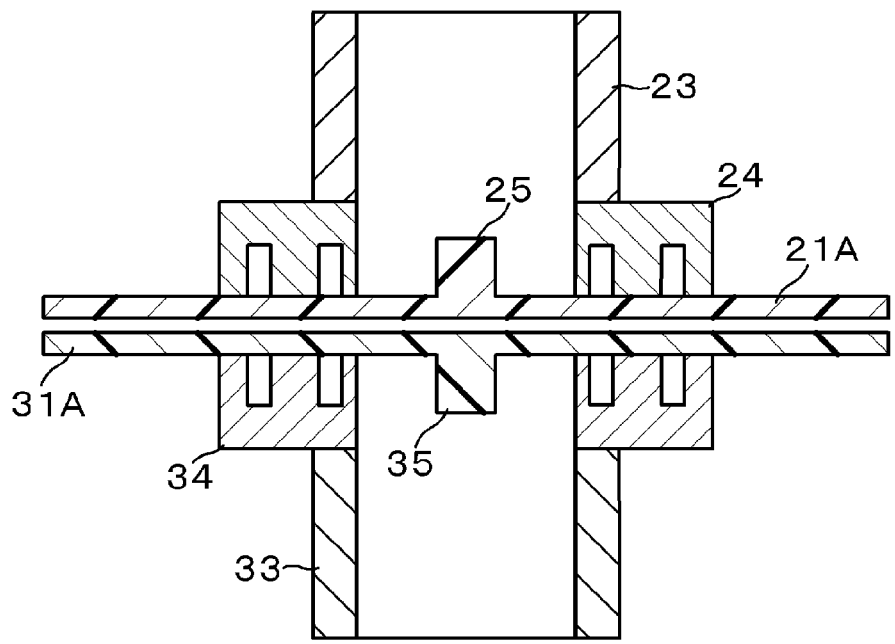
FIG. 5A is a cross-sectional view showing a cross-sectional structure of a connector device including the dielectric protrusions.
Figure 5B:
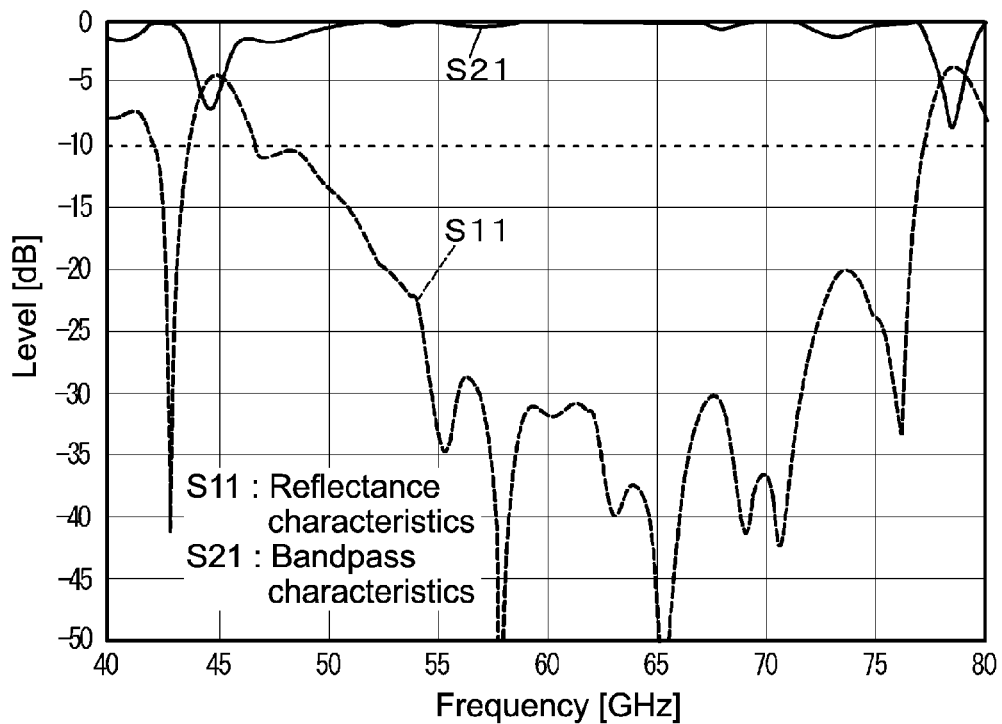
FIG. 5B is a diagram showing transmission characteristics of the connector device including the dielectric protrusions.

Here, simulation results are shown, in which the dielectric protrusions 25 and 35 are not provided on the inner surface of the resin plates 21A and 31A, and the dielectric protrusions 25 and 35 are provided on the inner surface of the resin plates 21A and 31A. FIG. 4A shows a cross-sectional structure of a connector device including no dielectric protrusions 25 and 35. FIG. 4B shows transmission characteristics of the connector device including no dielectric protrusions 25 and 35. Moreover, FIG. 5A shows a cross-sectional structure of a connector device including the dielectric protrusions 25 and 35. FIG. 5B shows transmission characteristics of the connector device including the dielectric protrusions 25 and 35.

In this simulation, a hollow rectangular waveguide (hollow waveguide) 4.2×2.1 [mm] in size is used as each of the waveguides 23 and 33. Moreover, the thickness of each of the resin plates 21A and 31A is 0.2 [mm]. Airspace 0.1 [mm] in thickness is provided between the resin plates 21A and 31A. Moreover, each of the dielectric protrusions 25 and 35 is a columnar protrusion, whose length (height from a plane, on which the opening terminal surface of the waveguide 23 or 33 is in contact with the resin plate 21A or 31A) is 1.6 [mm] and diameter is 1.1 [mm].

As is apparent from the transmission characteristics of FIG. 4B, if the level in dB is for example −10 [dB], the band of reflectance characteristics S11 of the connector device of FIG. 4A including no dielectric protrusions 25 and 35 is narrow, i.e., a frequency in gigahertz [GHz] of about 60 to 67 GHz. Moreover, as shown in bandpass characteristics S21, loss due to reflection is large in a frequency band of 67 to 75 gigahertz [GHz]. To the contrary, as is apparent from the transmission characteristics of FIG. 5B, if the level in dB is for example −10 [dB], the band of reflectance characteristics S11 of the connector device of FIG. 5A including the dielectric protrusions 25 and 35 is wider, i.e., a frequency in gigahertz [GHz] of about 47 to 77 GHz. Moreover, as shown in bandpass characteristics S21, loss due to reflection is suppressed, and entirely flat characteristics are attained. Note that, in narrow band transmission, radio waves are transmitted even if there is no dielectric protrusion 25 or 35 on the inner surface of the resin plates 21A or 31A.

EXAMPLES

Here, examples of the sender 22 and the waveguide 23 of the first communication device 20 and the receiver 32 and the waveguide 33 of the second communication device 30 of the communication system 10 of the above-mentioned embodiment will be described. Two typical examples are provided as follows.

Example 1

Figure 6A:
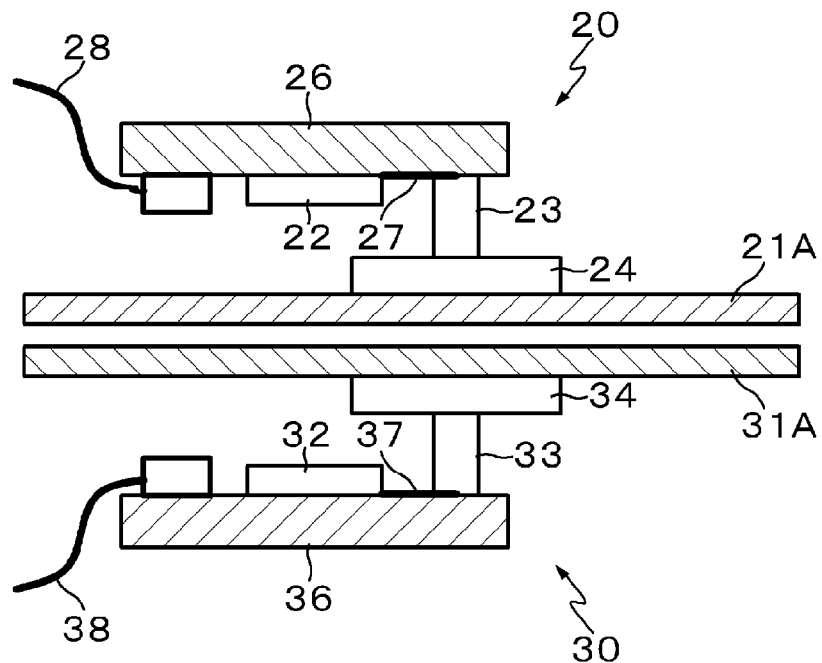
FIG. 6A is a side view partially including a sectional view showing the first communication device and the second communication device in a first example.

FIG. 6A is a side view partially including a sectional view showing the first communication device 20 and the second communication device 30 of Example 1. An IC chip, which is the sender 22 configured to send a millimeter-waveband signal, and other components are mounted on a board 26. An IC chip, which is the receiver 32 configured to receive a millimeter-waveband signal, and other components are mounted on a board 36. A track 27 such as a microstripline is provided between the output terminal of the sender 22 and one opening terminal of the waveguide 23. A track 37 such as a microstripline is provided between the input terminal of the receiver 32 and one opening terminal of the waveguide 33. The other opening terminal (i.e., the opening terminal at the choke structure 24 side) of the waveguide 23 is attached to the resin plate 21A. The other opening terminal (i.e., the opening terminal at the choke structure 34 side) of the waveguide 33 is attached to the resin plate 31A. The board 26 and a main board (not shown) exchange baseband signals, power, control signals, and the like via a flexible board 28, for example. The board 36 and a main board (not shown) exchange baseband signals, power, control signals, and the like via a flexible board 38, for example. Moreover, Example 1 is characterized in that the waveguide 23 is mounted on the surface of the board 26, on which the IC chip (the sender 22) is mounted. Example 1 is further characterized in that the waveguide 33 is mounted on the surface of the board 36, on which the IC chip (the receiver 32) is mounted.

Example 2

Figure 6B:
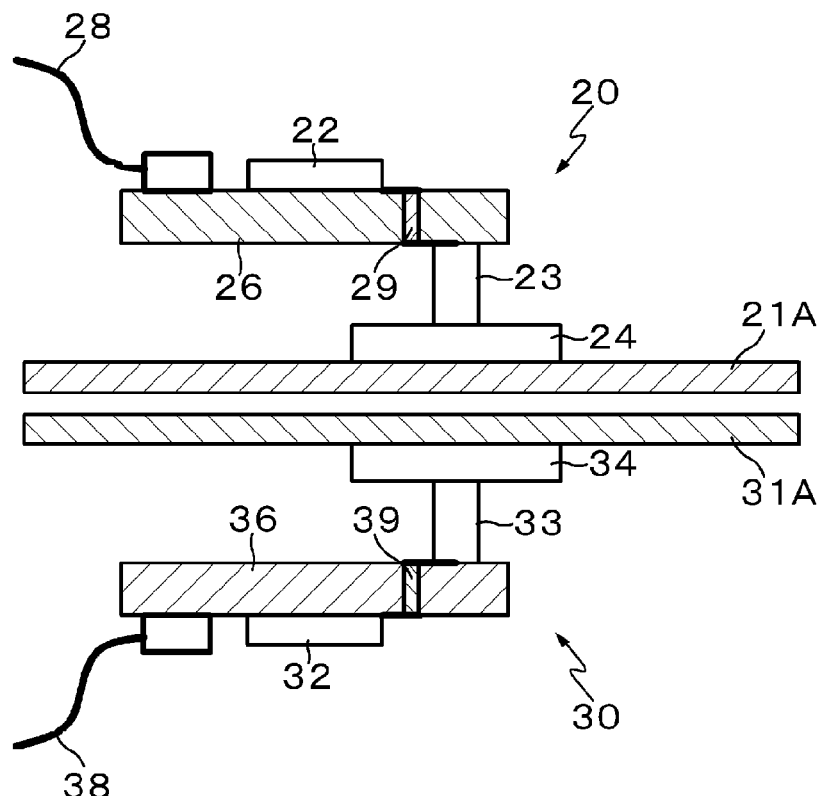
FIG. 6B is a side view partially including a sectional view showing the first communication device and the second communication device in a second example.

FIG. 6B is a side view partially including a sectional view showing the first communication device 20 and the second communication device 30 of Example 2. Example 2 is characterized in that the IC chip (the sender 22) is mounted on the board 26, the surface of the board 26 opposite to the IC chip faces the resin plate 21A, and the waveguide 23 is mounted on the opposite surface. Example 2 is further characterized in that the IC chip (the receiver 32) is mounted on the board 36, the surface of the board 36 opposite to the IC chip faces the resin plate 31A, and the waveguide 33 is mounted on the opposite surface. In Example 2, the IC chip (the sender 22) connects with the waveguide 23 through a via hole 29, and the IC chip (the receiver 32) connects with the waveguide 33 through a via hole 39.

Modification Examples of Examples

Figure 7:
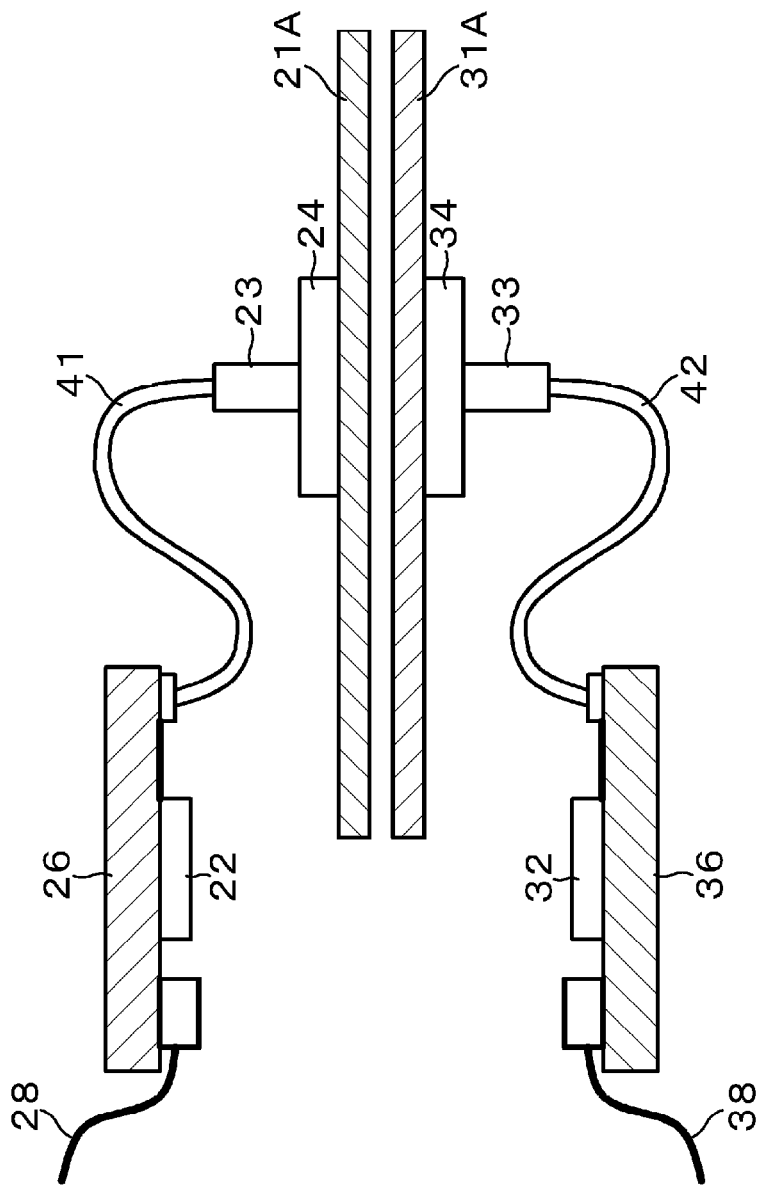
FIG. 7 is a side view partially including a sectional view showing a modification example of the first example.
Figure 8:
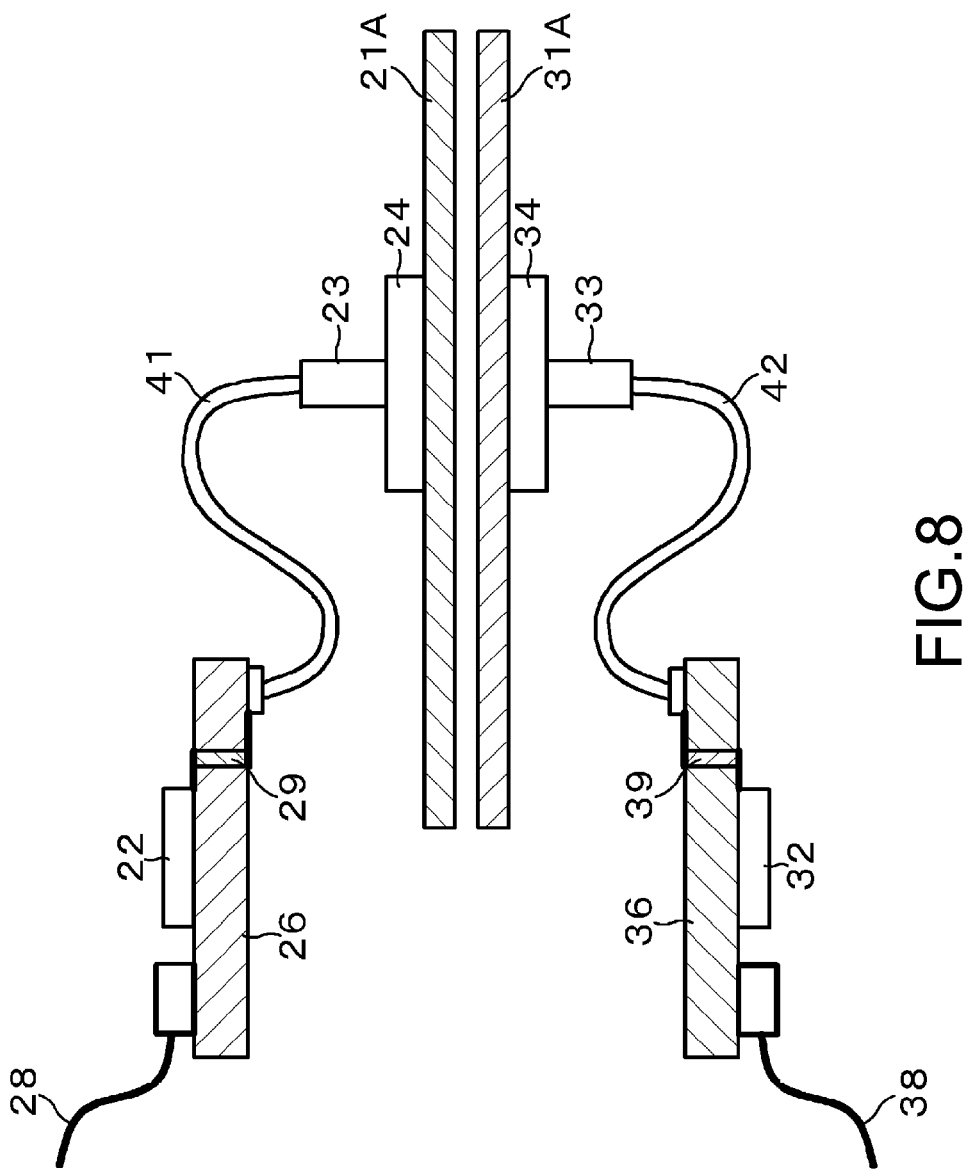
FIG. 8 is a side view partially including a sectional view showing a modification example of the second example.

In the above-mentioned typical Examples 1 and 2, each of the first communication device 20 and the second communication device 30 is a module including a waveguide. This is merely an example. Alternatively, the following modification examples may be employed. As shown in FIG. 7 and FIG. 8, a connector device including the waveguide 23, the resin plate 21A, and the dielectric protrusion 25 (not shown in FIGS. 7 and 8) is independent of a module unit including the IC chip (the sender 22), the board 26, and the like, and the connector device connects with the module unit through a transmission path 41 such as a cable or a waveguide. A connector device including the waveguide 33, the resin plate 31A, and the dielectric protrusion 35 (not shown in FIGS. 7 and 8) is independent of a module unit including the IC chip (the receiver 32), the board 36, and the like, and the connector device connects with the module unit through a transmission path 42 such as a cable or a waveguide. According to this structure, it is possible to arrange the connector device and the module unit separately. FIG. 7 is a side view partially including a sectional view showing a modification example of Example 1. FIG. 8 is a side view partially including a sectional view showing a modification example of Example 2.

Modification Examples of Embodiment

A preferable embodiment of the present disclosure has been described above. However, the technology of the present disclosure is not limited to the above-mentioned embodiment. The above-mentioned embodiment may be variously modified or improved within the gist of the technology of the present disclosure described in the claims.

Modification Example 1

Figure 9:
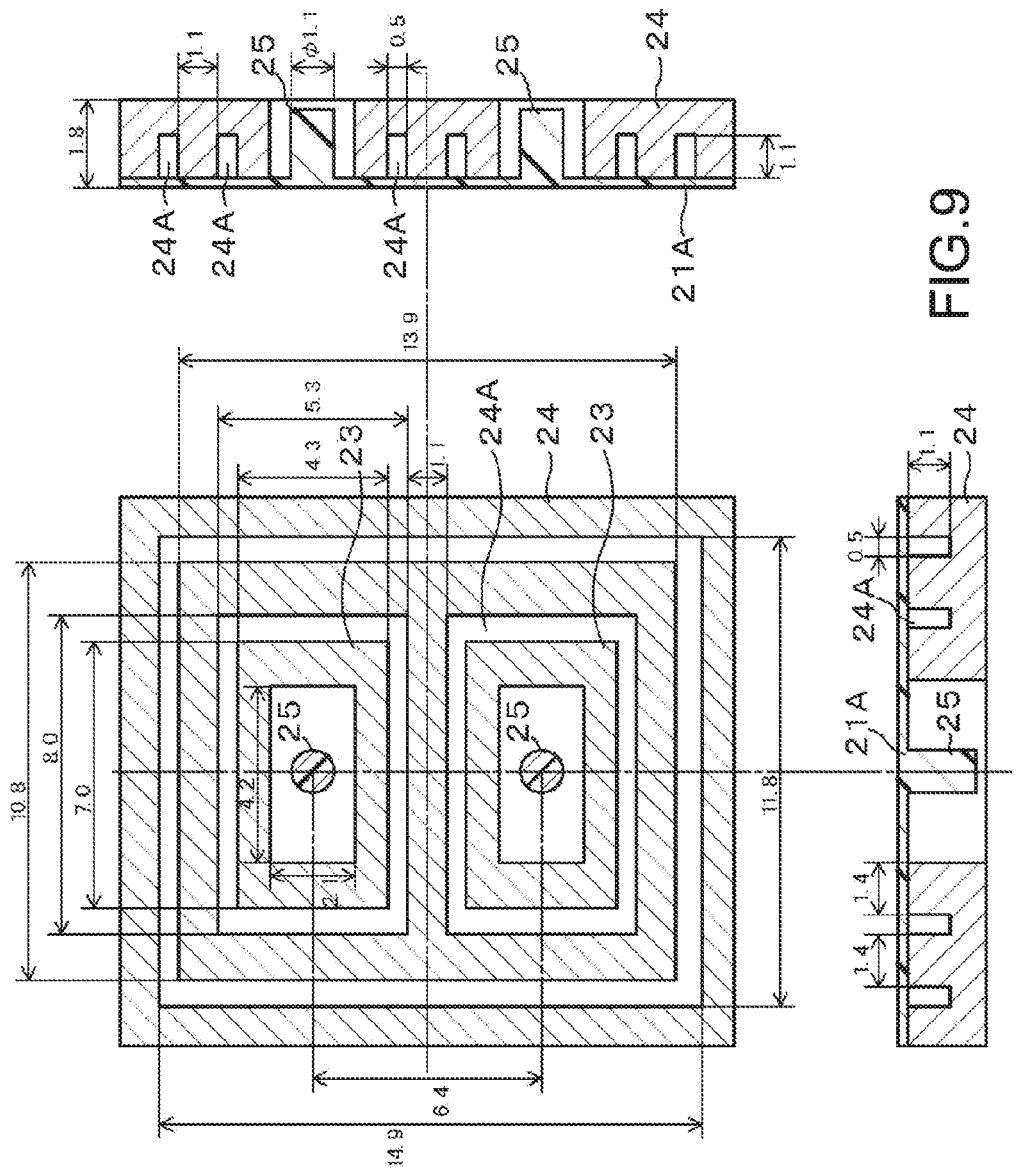
FIG. 9 is a diagram showing the structure of the waveguide of a first modification example of the first embodiment.

In the example of the above-mentioned embodiment, a communication system of one-way (unidirectional) communication is used. In this communication system, the first communication device 20 transmits a high-frequency signal to the second communication device 30. Alternatively, a communication system of bidirectional communication may be used. Specifically, for example, at least one of the two waveguides 23 and 33, each of which is a 2:1 rectangular waveguide, is included in a pair of structures. Each structure includes the waveguide path (waveguide), the dielectric plate (21A, 31A), and the dielectric protrusion (25, 35). Preferably, the pair of structures are formed integrally. Here, in the example shown in FIG. 9, each of the dielectric protrusions 25 is a column. As shown in FIG. 9, a pair (two lanes) of structures, each of which includes a waveguide path, a dielectric plate, and a dielectric protrusion, are provided. As a result, a communication system enabling bidirectional communication is constructed.

In the example of FIG. 9, the choke structure 24 includes an outer rectangular portion, a middle portion, and waveguide portions. The middle portion having a section with a width of 1.4 mm. Each of the waveguide portions having a section with a width of 1.4 mm.

A first groove of the grooves 24A is between the outer rectangular portion and the middle portion. A second groove of the grooves 24A is between the middle portion and a first waveguide portion of the waveguide portions. A third groove of the grooves 24A is between the middle portion and a second waveguide portion of the waveguide portions.

As illustrated in FIG. 9, an outer wall defining the first groove has a length of 14.9 millimeters (mm), a width of 11.8 mm, and a depth of 1.1 mm. The inner wall defining the first groove has a length of 13.9 mm, a width of 10.8 mm, and a depth of 1.1 mm. The first groove defined by the outer wall and the inner wall has a width of 0.5 mm.

Additionally, in FIG. 9, an outer wall defining the second groove has a length of 5.3 mm, a width of 8.0 mm, and a depth of 1.1 mm. An inner wall defining the second groove has a length of 4.3 mm, a width of 7.0 mm, and a depth of 1.1 mm. The second groove defined by the outer wall and the inner wall has a width of 0.5 mm.

The third groove has dimensions that are similar to the dimensions of the second groove. The second groove and the third groove are also separated by a portion of the middle portion with a length of 1.1 mm.

Each waveguide portion of the choke structure 24 includes a waveguide 23 that defines a waveguide path. Each of the pair of structures include a portion of the choke structure 24 and a portion of the dielectric plate 21A that includes a dielectric protrusion 25 that is positioned in the center of the waveguide path. The waveguide path has a length of 2.1 mm and a width of 4.2 mm. The dielectric protrusions 25 are separated from each other by a distance of 6.4 mm and have a diameter (ø) of 1.1 mm. The dielectric plate 21A and the choke structure 24 have a combined thickness of 1.8 mm.

Note that the numerical values shown in FIG. 9 are merely examples. Numerical values are not limited to those shown in FIG. 9.

Modification Example 2

Figure 10:
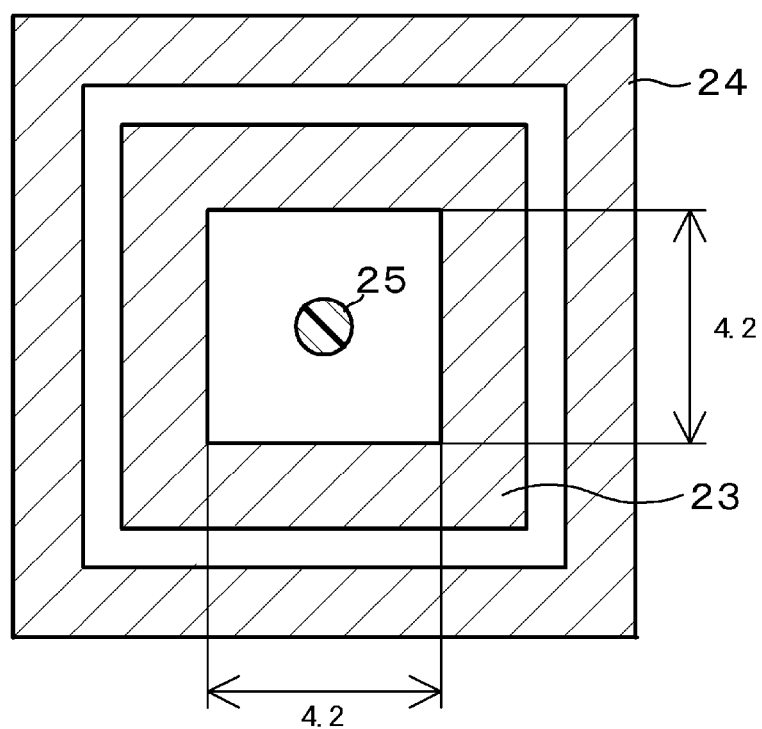
FIG. 10 is a diagram showing the structure of the waveguide of a second modification example of the first embodiment.

Moreover, the cross-sectional shape of at least one of the two waveguides 23 and 33 may be a square or a circle. As a result, a communication system enabling bidirectional communication may be constructed. Specifically, as shown in FIG. 10, the waveguide 23, whose cross-sectional shape is a square with a waveguide path having a width and a length of 4.2 mm. As a result, bidirectional communication of a horizontally-polarized wave and a vertically-polarized wave is realized, wherein the polarization plane of the horizontally-polarized wave is perpendicular to the polarization plane of the vertically-polarized wave. If a waveguide, whose cross-sectional shape is a circle, is used, bidirectional communication of a right-handed circularly polarized wave and a left-handed circularly polarized wave is realized. The right-handed circularly polarized wave rotates to the right relative to the travel direction of a radio wave. The left-handed circularly polarized wave rotates to the left relative to the travel direction of a radio wave.

Modification Example 3

Moreover, in the example of the above-mentioned embodiment, the sender-side waveguide 23 includes the dielectric plate (the resin plates 21A) and the dielectric protrusion (25), and the receiver-side waveguide 33 includes the dielectric plate (the resin plates 31A) and the dielectric protrusion (35). However, the structure is not limited to this. Note that at least the sender-side waveguide 23 includes the dielectric plate and the dielectric protrusion. As a result, the waveguide 23 is capable of suppressing reflection of radio waves at a contact surface of the opening terminal surface of the waveguide 23 and the dielectric plate (the resin plate 21A). Moreover, if the receiver-side waveguide 33 includes them, it is possible to suppress more reflection of radio waves.

Modification Example 4

Moreover, in the above-mentioned embodiment, the technology of the present disclosure is applied to the communication system 10 including the first communication device 20 and the second communication device 30. Alternatively, the technology of the present disclosure is applicable to a sender-side communication device, i.e., the first communication device 20. In this case, the communication device of the present disclosure includes a connector device including: the waveguide 23; the resin plate (dielectric plate) 21A provided on the opening terminal surface of the waveguide 23; and the dielectric protrusion 25 provided on a plane, on which the opening terminal surface of the waveguide 23 is in contact with the resin plate 21A, at the center position of the opening terminal surface. Moreover, the communication device is configured to transmit a high-frequency signal to another communication device (the second communication device 30) including the waveguide 33 when the opening terminal of the waveguide 23 is in contact with or in the vicinity of the opening terminal of the waveguide 33.

<Specific Examples of Communication System of Embodiment>

The following combinations of the first communication device 20 the second communication device 30 may be employed. Note that the following combinations are merely examples, and combinations are not limited to the following examples. Note that the signal transmission system between the first communication device 20 and the second communication device 30 may be a unidirectional (one-way) transmission system or a bidirectional transmission system.

The second communication device 30 may be a battery-powered equipment such as a mobile phone, a digital camera, a video camera, a game machine, or a remote control. In this case, the first communication device 20 in combination may be an apparatus, i.e., a so-called base station, which is configured to charge the battery, to process images, and the like. Alternatively, the second communication device 30 may be a relatively-thin device such as an integrated circuit card. In this case, the first communication device 20 in combination may be a card reader/writer. Moreover, the card reader/writer is used in combination with a main electronic apparatus such as, for example, a digital recorder/reproducer, a terrestrial television receiver, a mobile phone, a game machine, or a computer.

Moreover, a combination of a mobile terminal device and a cradle may be employed. A cradle is a stationary expansion device configured to charge the battery of a mobile terminal device, to transfer data to the mobile terminal device, or perform expansion. In the communication system of the system structure of FIG. 1, the first communication device 20 is a cradle. Note that the first communication device 20 includes the sender 22 configured to send a millimeter-waveband signal, the waveguide 23, the resin plate (dielectric plate) 21A, and the dielectric protrusion 25. Moreover, the second communication device 30 is a mobile terminal device. Note that the second communication device 30 includes the receiver 32 configured to receive a millimeter-waveband signal, the waveguide 33, the resin plate (dielectric plate) 31A, and the dielectric protrusion 35.

Note that the present disclosure may employ the following structures.

(1) A connector system, comprising: a first waveguide having a first opening terminal and a second waveguide having a second opening terminal, the first and second waveguides being configured to transmit a high-frequency signal when the first opening terminal is in contact with or in the vicinity of the second opening terminal; and a dielectric plate provided on an opening terminal surface of at least one of the first and second opening terminals.

(2) The connector system according (1), further comprising: a dielectric protrusion provided on a plane on which the opening terminal surface is in contact with the dielectric plate, the dielectric protrusion being located at the center position of the opening terminal surface.

(3) The connector system according to (1) or (2), wherein the first and second waveguides are a sender-side waveguide and a receiver-side waveguide, and the dielectric plate and the dielectric protrusion are provided at least on the sender-side waveguide.

(4) The connector system according to (3), wherein at least the sender-side waveguide includes a choke structure around the opening terminal thereof.

(5) The connector system according to (4), wherein the depth of a groove of the choke structure is ¼ of the high-frequency wavelength transmitted by the first and second waveguides.

(6) The connector system according to any one of (2) to (5), wherein the dielectric protrusion is a 3D structure, the 3D structure being one of a rectangular parallelepiped and a column.

(7) The connector system according to (6), wherein the height of the dielectric protrusion from the plane is ½ of the high-frequency wavelength transmitted by the first and second waveguides.

(8) The connector system according to (7), wherein if the 3D structure is a rectangular parallelepiped, the length of each side of the dielectric protrusion is ½ of the high-frequency wavelength, and if the 3D structure is a column, the diameter of the dielectric protrusion is ½ of the high-frequency wavelength.

(9) The connector system according to any one of (1) to (8), wherein the dielectric plate is part of a chassis, the corresponding waveguide being housed within the chassis.

(10) The connector system according to (9), wherein the dielectric protrusion is integrally formed with the chassis, the corresponding waveguide being housed within the chassis.

(11) The connector system according to any one of (1) to (10), wherein the cross-sectional shape of each of the first and second waveguides is a rectangle.

(12) The connector system according to (11), wherein the ratio of a long side to a short side of the cross-sectional surface of each of the first and second waveguides is 2:1.

(13) The connector system according to (11) or (12), wherein at least one of the first and second waveguides includes a pair of structures, each of the pair of structures including a waveguide path, the dielectric plate, and the dielectric protrusion, at least one of the first and second waveguides being configured to perform bidirectional communication.

(14) The connector system according to (13), wherein the pair of structures are integrally formed.

(15) The connector system according to any one of (1) to (14), wherein the cross-sectional shape of at least one of the first and second waveguides is one of a square and a circle.

(16) The connector system according to (15), wherein if the cross-sectional shape of at least one of the first and second waveguides is a square, at least one of the first and second waveguides is configured to perform bidirectional communication using a horizontally-polarized wave and a vertically-polarized wave, and if the cross-sectional shape of at least one of the first and second waveguides is a circle, at least one of the first and second waveguides is configured to perform bidirectional communication using a right-handed circularly polarized wave and a left-handed circularly polarized wave.

(17) The connector system according to any one of (1) to (16), wherein the high-frequency signal is a millimeter-waveband signal.

(18) A communication device, comprising: a connector system including a waveguide, and a dielectric plate provided on an opening terminal surface of the waveguide, wherein the communication device is configured to transmit a high-frequency signal when the opening terminal of the waveguide is in contact with or in the vicinity of another opening terminal of a waveguide of another communication device including another waveguide.

(19) The communication device according to (18), wherein the high-frequency signal is a millimeter-waveband signal.

(20) A communication system, comprising: a first communication device including a first waveguide and a second communication device including a second waveguide, the first and second waveguides respectively being configured to transmit a high-frequency signal, the first and second communication devices respectively being configured to communicate with each other when the first waveguide is in contact with or in the vicinity of the second waveguide; a connector system configured to connect the first and second waveguides when a first opening terminal of the first waveguide is in contact with or in the vicinity of a second opening terminal of the second waveguide, wherein the connector system includes a dielectric plate provided on an opening terminal surface of at least one of the first and second waveguides.

(21) The communication system according to (20), wherein the high-frequency signal is a millimeter-waveband signal.

What is claimed is:

1. A connector system comprising:
   a first waveguide having a first opening terminal;
   a second waveguide having a second opening terminal;
   a first dielectric plate provided on an opening terminal surface of the first opening terminal; and
   a second dielectric plate provided on an opening terminal surface of the second opening terminal,
   wherein the first waveguide and the second waveguide are configured to transmit a millimeter-waveband data signal when the first opening terminal is in contact with or in a vicinity of the second opening terminal.

2. The connector system according to claim 1, further comprising:
   a dielectric protrusion that is provided on an inner surface of the first dielectric plate, the dielectric protrusion being located at a center position of the opening terminal surface of the first opening terminal.

3. The connector system according to claim 2, further comprising:
   a second dielectric protrusion that is provided on an inner surface of the second dielectric plate, the second dielectric protrusion being located at a center position of the opening terminal surface of the second opening terminal, wherein
   the first waveguide is a sender-side waveguide,
   the second waveguide is a receiver-side waveguide.

4. The connector system according to claim 3, wherein at least the sender-side waveguide includes a choke structure around the first opening terminal.

5. The connector system according to claim 4, wherein a depth of a groove of the choke structure is ¼ of a wavelength of the millimeter-waveband data signal transmitted by the first waveguide and received by the second waveguide.

6. The connector system according to claim 3, wherein the dielectric protrusion and the second dielectric protrusion are three-dimensional (3D) structures, and wherein each of the 3D structures is one of a rectangular parallelepiped or a column.

7. The connector system according to claim 1, wherein a cross-sectional shape of at least one of the first waveguide and the second waveguide is one of either a square or a circle.

8. The connector system according to claim 1, wherein the first waveguide and the second waveguide are configured to transmit data of the millimeter-waveband data signal from a first data communication device to a second data communication device on an order of gigabits-per-second.

9. The connector system according to claim 1, wherein the first dielectric plate is part of a chassis, and wherein the first waveguide is housed within the chassis.

10. The connector system according to claim 1, wherein the first dielectric plate comprises a first resin material, and wherein the second dielectric plate comprises a second resin material.

11. The connector system according to claim 1, wherein a cross-sectional shape of each of the first waveguide and the second waveguide is a rectangle.

12. The connector system according to claim 11, wherein a ratio of a long side to a short side of a cross-sectional surface of each of the first waveguide and the second waveguide is 2:1.

13. A connector system comprising:
    a first waveguide having a first opening terminal;
    a second waveguide having a second opening terminal;
    a first dielectric plate provided on an opening terminal surface of the first opening terminal;
    a second dielectric plate provided on an opening terminal surface of the second opening terminal;
    a first dielectric protrusion provided on the first dielectric plate; and
    a second dielectric protrusion provided on the second dielectric plate,
    wherein a cross-sectional shape of each of the first waveguide and the second waveguide is a rectangle,
    wherein the first waveguide, the first dielectric plate, and the first dielectric protrusion form a first structure of a pair of structures,
    wherein the second waveguide, the second dielectric plate, and the second dielectric protrusion form a second structure of the pair of structures, and
    wherein the pair of structures is configured to perform bidirectional communication.

14. The connector system according to claim 13, wherein the pair of structures are integrally formed with each other.

15. A connector system comprising:
    a first waveguide having a first opening terminal;
    a second waveguide having a second opening terminal;
    a first dielectric plate provided on an opening terminal surface of the first opening terminal;
    a second dielectric plate provided on an opening terminal surface of the second opening terminal; and
    a dielectric protrusion is provided on a plane on which the opening terminal surface of the first opening terminal is in contact with the first dielectric plate, the dielectric protrusion being located at a center position of the opening terminal surface of the first opening terminal,
    wherein the first waveguide and the second waveguide are configured to transmit a high-frequency signal when the first opening terminal is in contact with or in a vicinity of the second opening terminal,
    wherein the dielectric protrusion is a three-dimensional (3D) structure that is one of a rectangular parallelepiped or a column, and
    wherein a height of the dielectric protrusion from the plane is ½ of a wavelength of the high-frequency signal transmitted by the first waveguide and received by the second waveguide.

16. The connector system according to claim 15, wherein,
when the 3D structure is the rectangular parallelepiped, a length of each side of the dielectric protrusion is ½ of the wavelength of the high-frequency signal, and wherein,
when the 3D structure is the column, a diameter of the dielectric protrusion is ½ of the wavelength of the high-frequency signal.

17. The connector system according to claim 15, wherein the high-frequency signal is a millimeter-waveband signal.

18. A data communication device comprising:
a connector system including
  a waveguide; and
  a dielectric plate provided on an opening terminal surface of the waveguide, wherein
the data communication device is configured to transmit a millimeter-waveband data signal when an opening terminal of the waveguide is in contact with or in a vicinity of a second opening terminal of a second waveguide of a second data communication device.

19. A connector system comprising:
a first waveguide having a first opening terminal;
a second waveguide having a second opening terminal;
a first dielectric plate provided on an opening terminal surface of the first opening terminal; and
a second dielectric plate provided on an opening terminal surface of the second opening terminal,
wherein the first waveguide and the second waveguide are configured to transmit a millimeter-waveband data signal when the first opening terminal is in contact with or in a vicinity of the second opening terminal;
a cross-sectional shape of at least one of the first waveguide and the second waveguide is one of a square or a circle, wherein,
when the cross-sectional shape of at least one of the first waveguide and the second waveguide is the square, at least one of the first waveguide and the second waveguide is configured to perform a first bidirectional communication using a horizontally-polarized wave and a vertically-polarized wave, and wherein,
when the cross-sectional shape of at least one of the first waveguide and the second waveguide is the circle, at least one of the first waveguide and the second waveguide is configured to perform a second bidirectional communication using a right-handed circularly polarized wave and a left-handed circularly polarized wave.

20. A communication system comprising:
a first communication device including a first waveguide;
a second communication device including a second waveguide; and
a connector system configured to connect the first waveguide and the second waveguide when a first opening terminal of the first waveguide is in contact with or in a vicinity of a second opening terminal of the second waveguide,
wherein the connector system includes a dielectric plate provided on at least one of a first opening terminal surface of the first waveguide or a second opening terminal surface of the second waveguide,
wherein the first waveguide and the second waveguide are configured to transmit a millimeter-waveband signal,
wherein the first communication device and the second communication device are configured to communicate with each other when the first waveguide is in contact with or in the vicinity of the second waveguide.

21. The communication system according to claim 20, wherein the millimeter-waveband signal is a millimeter-waveband data signal, and wherein data of the millimeter-waveband data signal is transmitted between the first communication device and the second communication device on an order of gigabits-per-second.

22. A connector system comprising:
a first waveguide having a first opening terminal;
a second waveguide having a second opening terminal;
a first dielectric plate provided on an opening terminal surface of the first opening terminal; and
a second dielectric plate provided on an opening terminal surface of the second opening terminal,
wherein the first waveguide and the second waveguide are configured to transmit a millimeter-waveband signal when the first opening terminal is in contact with or in a vicinity of the second opening terminal, wherein
the first dielectric plate is part of a chassis, and wherein the first waveguide is housed within the chassis;
a dielectric protrusion provided on an inner surface of the first dielectric plate, the dielectric protrusion being located at a center position of the opening terminal surface of the first opening terminal, wherein
the dielectric protrusion is integrally formed with the first dielectric plate.

* * * * *